United States Patent
Endo

[19]

[11] Patent Number: 5,933,846
[45] Date of Patent: Aug. 3, 1999

[54] REWRITABLE ROM FILE DEVICE HAVING READ/WRITE BUFFER ACCESS CONTROL VIA COPY OF REWRITABLE AREA

[75] Inventor: Kaoru Endo, Tokyo, Japan

[73] Assignee: NEC Corporation, Tokyo, Japan

[21] Appl. No.: 08/552,290

[22] Filed: Nov. 2, 1995

[30] Foreign Application Priority Data

Nov. 24, 1994 [JP] Japan .................................. 6-288509

[51] Int. Cl.⁶ .................................................. G11C 16/00
[52] U.S. Cl. ........................................ 711/103; 365/185.29
[58] Field of Search ................................. 395/430, 651, 395/652, 653; 365/185.29, 185.33; 711/103

[56] References Cited

U.S. PATENT DOCUMENTS

| | | | |
|---|---|---|---|
| 5,297,148 | 3/1994 | Harari et al. ............................ | 371/10.2 |
| 5,327,531 | 7/1994 | Bealkowski et al. .............. | 395/182.04 |
| 5,379,262 | 1/1995 | Okamoto et al. ................... | 365/230.01 |
| 5,404,485 | 4/1995 | Ban ......................................... | 711/202 |
| 5,412,612 | 5/1995 | Oyama .................................... | 365/228 |
| 5,487,161 | 1/1996 | Koenck et al. ......................... | 711/115 |
| 5,509,134 | 4/1996 | Fandrich et al. ........................ | 711/103 |
| 5,515,333 | 5/1996 | Fujita et al. ............................ | 365/229 |
| 5,515,532 | 5/1996 | Iijima ....................................... | 395/616 |
| 5,519,831 | 5/1996 | Holzhammer ........................ | 395/182.2 |
| 5,519,843 | 5/1996 | Moran et al. ............................ | 395/430 |
| 5,530,828 | 6/1996 | Kaki et al. ................................ | 711/103 |
| 5,535,357 | 7/1996 | Moran et al. ............................ | 711/103 |
| 5,542,077 | 7/1996 | Johnson et al. ..................... | 395/750.01 |
| 5,544,356 | 8/1996 | Robinson et al. ...................... | 395/621 |
| 5,579,502 | 11/1996 | Konishi et al. ......................... | 395/430 |
| 5,579,522 | 11/1996 | Christeson et al. .................... | 395/652 |
| 5,590,373 | 12/1996 | Whitley et al. ......................... | 395/828 |
| 5,644,539 | 7/1997 | Yamagami et al. .................... | 365/200 |
| 5,696,929 | 12/1997 | Hasbun et al. .......................... | 711/103 |

OTHER PUBLICATIONS

Markus Levy, "Series 2+ Flash Memory Card User's Manual" Nov. 1993, Intel, pp. 5–1 thru 5–24.

*Primary Examiner*—Eddie P. Chan
*Assistant Examiner*—Hong Kim
*Attorney, Agent, or Firm*—Whitham, Curtis & Whitham

[57] ABSTRACT

A rewritable read only memory (ROM) file device having a special area storing a directory, a file allocation table, and a rewritable area. An access controller copies the content of the special area into a buffer by an initialization process. After the initialization process, the access controller converts subsequent access requests to the special area of the ROM file device into an access to the buffer. The access controller detects a termination of a use of the ROM file device and, in response, returns the data stored in the buffer to the device's special area.

3 Claims, 13 Drawing Sheets

REWRITABLE ROM FILE DEVICE HAVING READ/WRITE BUFFER ACCESS CONTROL VIA COPY OF REWRITABLE AREA

BACKGROUND OF THE INVENTION

1. Field of the Invention

The present invention relates to a rewritable ROM file device and, more specifically, to a rewritable ROM file device using an EPROM (erasable programmable read-only memory), an EEPROM (electrically erasable programmable read-only memory), or the like as a storage medium.

2. Description of the Related Art

In conventional information processing, a magnetic disk device such as a floppy disk device or a hard disk device is used as a file device. However, in recent years, with the spread of portable information processing apparatuses such as a notebook-type personal computer, rewritable ROMs such as an EPROM and an EEPROM have come to be used as a file device.

An operating system (OS) secures a certain management area in a file device to manage files stored in the file device. For example, in MS-DOS (registered trademark of Microsoft Corporation), which is a standard OS of portable information processing apparatus, files stored in a file device are managed by using a table called a file allocation table (FAT). Referring to FIG. 1, the whole file device is divided into units called clusters, which are given numbers in order from the head cluster. Data of a FAT 2 correspond to the respective clusters. The FAT 2 indicates in what order the respective clusters are used. A directory 1 indicates the number of a cluster where the head data of each file is stored.

To find out where file A, for instance, is stored in the file device 3, first the directory 1 is referred to, that is, cluster numbers 12 indicating head clusters of respective files having file names 11 are checked. As a result, a head cluster position "002" of file A is obtained. Then, to find out the position of the second cluster, address "002" of the FAT 2 is referred to. As a result, the second cluster position "003" is obtained. Similarly, the next cluster position "004" is obtained by referring to address "003" of the FAT 2. If "FFF" is found in the FAT 2, it means the end of file A. For clusters not in use, "000" is stored in the FAT 2.

The FAT 2 is subjected to rewriting at each occurrence of writing to a file, which means that a particular area of the file device 3 is frequently subjected to rewriting.

However, a rewritable count of data onto a rewritable ROM is limited. For example, it is said that under the existing techniques of an EEPROM a rewritable count of data is $10^4$ to $10^5$. Therefore, if rewriting occurs frequently on a particular area such as a FAT, the life of an EEPROM is extremely shortened.

Further, in an EEPROM, since rewriting is performed on a block basis where blocks have a predetermined size, data of the entire block needs to be rewritten to rewrite only a part of the entire data. For example, data of 64 Kbytes needs to be rewritten to rewrite data of only 1 byte, which causes a slow down of the file access.

Conventionally, for example, U.S. Pat. No. 5,379,262 of Okamoto et al. granted on Jan. 3, 1995 discloses a technique for solving the above problems. This technique prevents concentration of write operations on a particular memory area by writing data to a plurality of memory areas of an EEPROM in a uni-directionally circulated manner. This conventional technique avoids an imbalance in the numbers of rewrite operations on the memory areas by moving data that is stored in the same location for a long time without being changed. Further, this technique prevents concentration of write operations on a particular area by hierarchically storing pointers which indicate positions of a table that is used to manage files.

However, in the above conventional technique, it is cumbersome to manage the operation of constantly moving storage locations of files. Further, to access the table for file management, it is necessary to trace pointers hierarchically. This may increase the access time.

SUMMARY OF THE INVENTION

An object of the present invention is to solve the above problems, to thereby avoid concentration of writing operations on a particular area in a rewritable ROM file device. That is, it is intended to elongate the life of a rewritable ROM file device, to thereby increase its reliability.

Another object of the present invention is to increase the speed of accessing a rewritable ROM file device.

In a ROM file device according to a preferred embodiment of the invention, a copy of a partial area of a rewritable ROM is stored in a buffer. By introducing the buffer, access to the partial area is converted into access to the buffer.

BRIEF DESCRIPTION OF THE DRAWINGS

An embodiment of the present invention will become more apparent when described in connection with the following drawings.

DESCRIPTION OF THE PREFERRED EMBODIMENT

An embodiment of the present invention will be hereinafter described with reference to the accompanying drawings.

Figure 2:
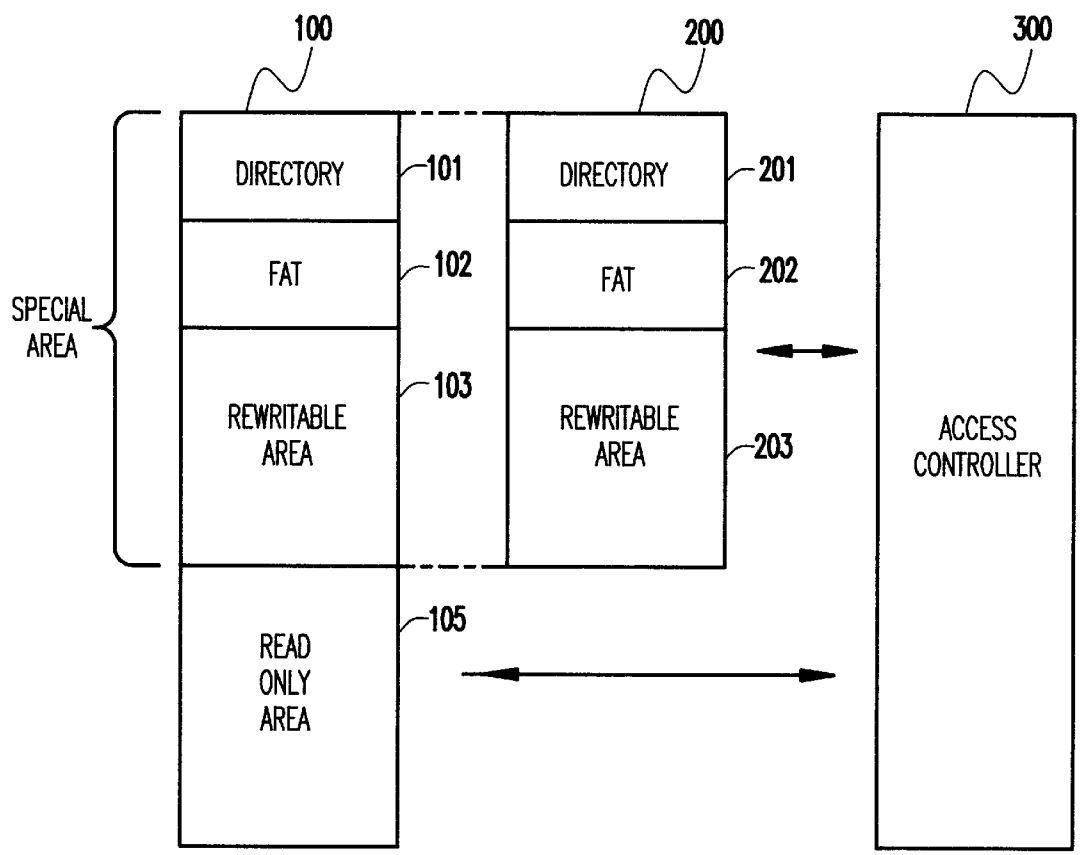
FIG. 2 block diagram showing a rewritable ROM file device according to an embodiment of the invention.

Referring to FIG. 2, according to this embodiment, a rewritable ROM file device is composed of a ROM file 100, a buffer 200, and an access controller 300. The access controller 300 may be implemented either by hardware or by software or firmware.

The inside of the ROM file 100 is divided into a directory 101, a FAT 102, a rewritable area 103, and a read-only area 105 according to their purposes. The area consisting of the directory 101, FAT 102, and rewritable area 103 is called a special area. The special area occupies a unified area. Although its size and storage locations in the ROM file 100 can be selected arbitrarily, they need to be determined in advance. Such information needs to be set as parameters or the like, for instance, at the time of initializing the access controller 300.

The access controller 300 may be implemented as part of a BIOS (basic input/output system) of an apparatus in which the file device is used. Alternatively, it may be incorporated as a device driver or a terminate and stay resident (TSR) program.

The operation of this embodiment will be outlined below. Details of the operation will be described later.

Referring to FIG. 2, the access controller 300 copies all of the contents of the special area of the ROM file 100 into the buffer 200. Therefore, immediately after the copying, the buffer 200 stores a directory 201, a FAT 202, and a rewritable area 203 (see FIG. 2). The directory 201 has the same data as the directory 101 of the ROM file 100, the FAT 202 has the same data as the FAT 102 of the ROM file 100, and the rewritable area 203 has the same data as the rewritable area 103 of the ROM file 100.

The copying of data from the special area of the ROM file 100 into the buffer 200 should be completed at least by a time point immediately before data writing to the ROM file device from an information processing apparatus.

Figure 9:
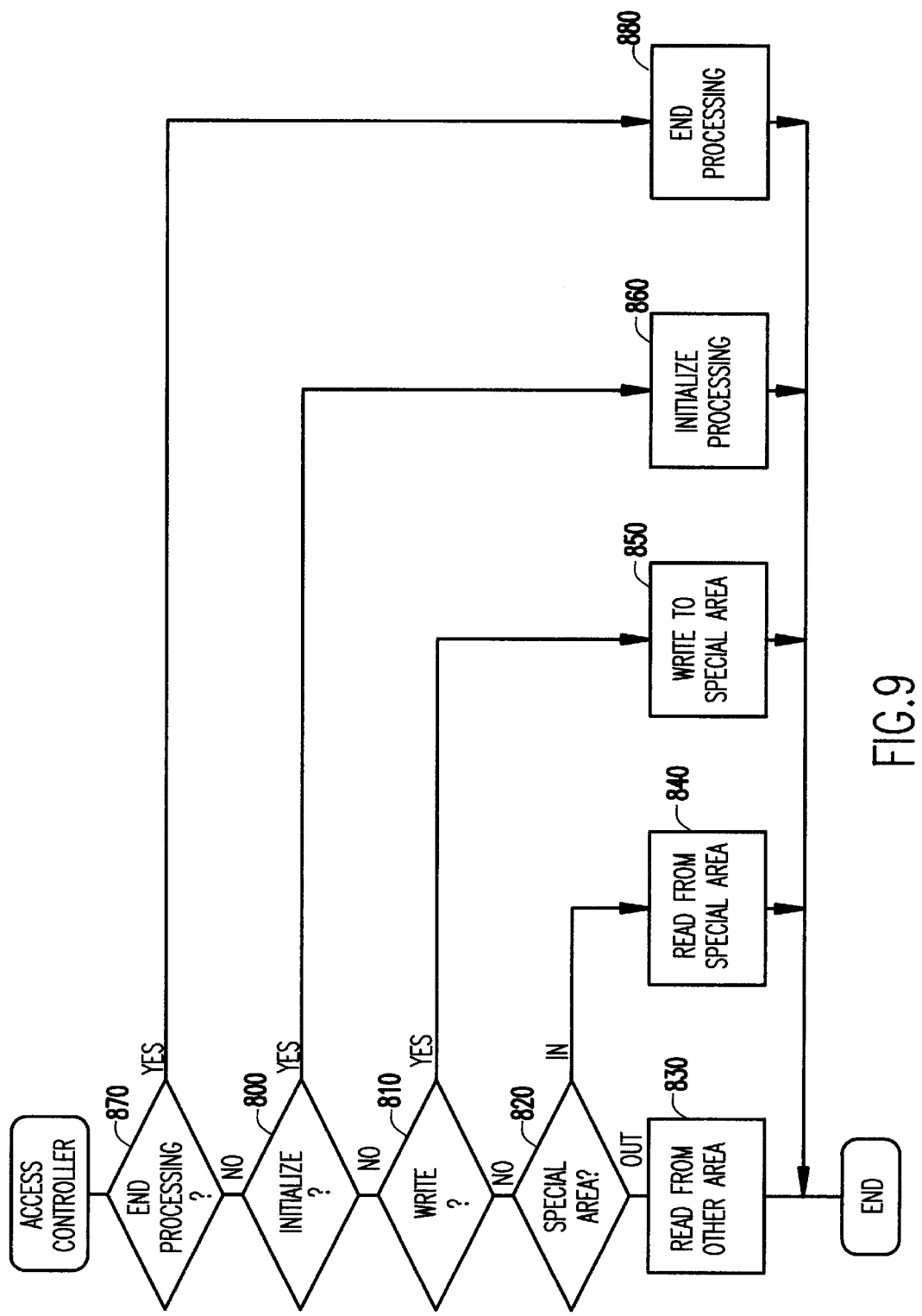
FIG. 9 is a flowchart showing the entire operation of the rewritable ROM file device of the invention.

Referring to FIG. 9, when instructed to read data from the ROM file 100 by application software through a DOS, the access controller 300 checks whether the instruction is an end processing request (step 870). If it is the end processing request, the access controller 300 performs end processing (step 880). If the instruction is not the end processing request, the access controller 300 checks whether it is an initializing request (step 800). If it is the initialize request, the access controller 300 performs initialize processing (step 860). If the instruction is not the initialize request, the access controller 300 checks whether it is a write request (step 810). If it is the write request, the access controller 300 writes data to a storage location of the write request in the buffer 200 (step 850). If the instruction is not the write request, the instruction is assumed to be read request. Then, the access controller 300 judges whether the read request is directed to the special area or the read-only area 105 of the ROM file 100 (step 820). This judgment may be made based on a parameter that was given at the initialization of the access controller 300, or may be incorporated in the judgment step (step 820) of the program. An example of a specific method of performing this judgment is the comparison between the address range of the special area and the address of the read request.

If it is judged that the read request is directed to the outside of the special area, the access controller 300 reads specified data from the read-only area 105 of the ROM file 100 (step 830). If it is judged that the read request is directed to the special area, the access controller 300 reads data from the buffer 200 which data corresponds to data stored at a read-requested storage location of the ROM file 100 (step 840), and supplies the readout data to the application software through the DOS.

In the above-mentioned write processing, writing to areas other than the special area should not occur, because a write-requested file is stored in the rewritable area 103 of the ROM file. However, if writing to an area other than the special area occurs accidentally due to a program error, problems such as file destruction will occur. To avoid such a case, error judgment may be performed in the write processing (step 850). This will be described later.

The above-mentioned initialize processing is to perform initial setting of the operation states of the file device. The processing is performed when a device that will access the file device is, for instance, connected to the file device, replaced, or powered on, or when the DOS is initialized. The initializing processing includes allocating of a memory area for the buffer 200, initialization of variables, flags, etc. that are used in the access controller 300, and various kinds of setting for the operation of the access controller 300.

The above-mentioned end processing is to terminate the operation of the file device. The processing is performed when an apparatus for which the file device is used is, for instance, disconnected, replaced, or powered off, or when the use of the file device is ended. In the end processing, first the data of the buffer 200 is written to the ROM file 100, and then the other end processing is performed. The other end processing includes release of the memory area that has been used as the buffer 200, allowing another program to use that memory area, and release of a memory area where the program itself of the access controller 300 has resided.

Next, the configuration of the ROM file 100 will be described.

Figure 3:
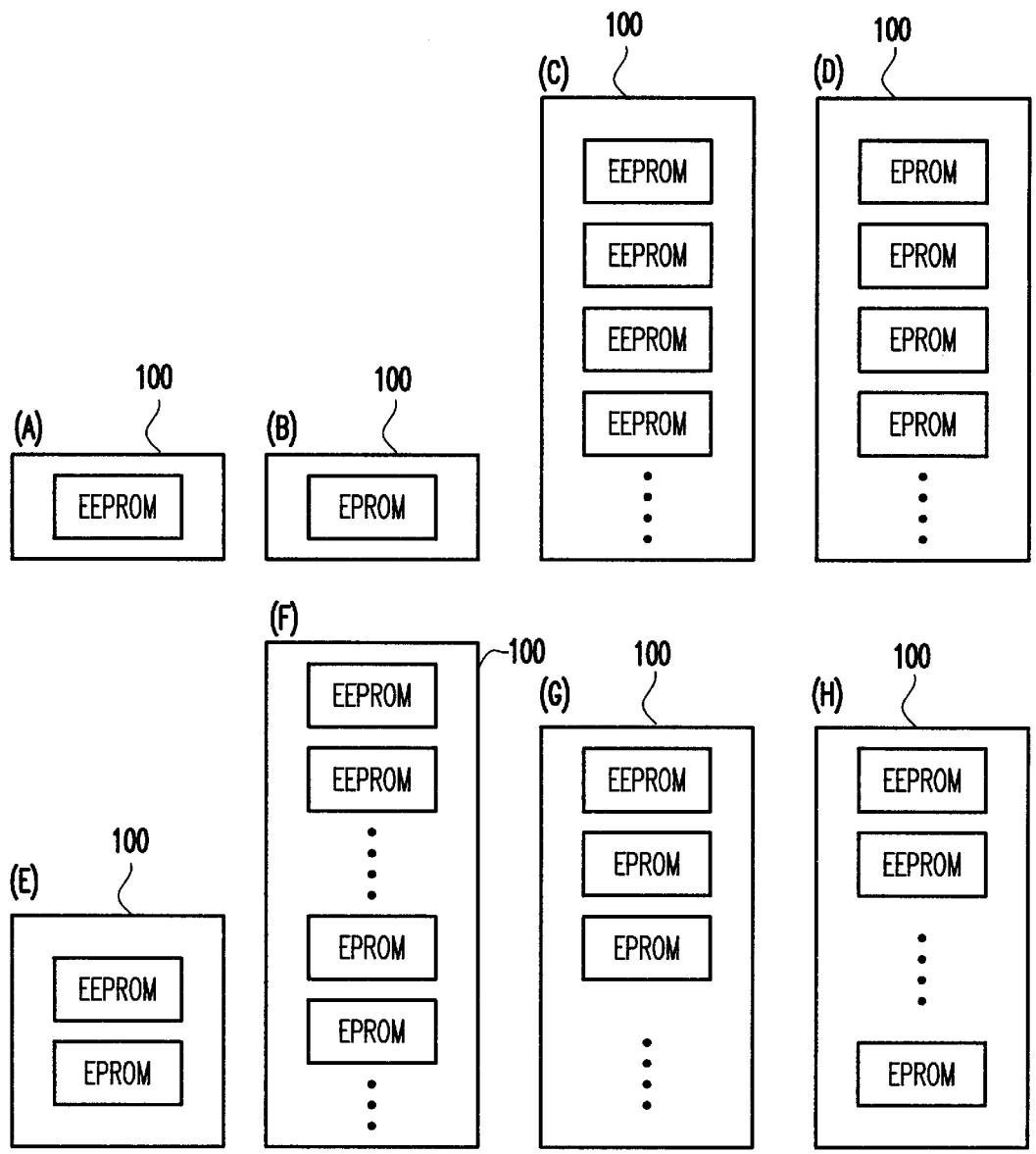
FIG. 3 shows variations of the internal configuration of a ROM file according to the invention.

Referring to FIG. 3, the ROM file 100 is composed of rewritable ROMs such as an EPROM and an EEPROM. Examples of the configuration of the ROM file 100 are (A) one EEPROM, (B) one EPROM, (C) a plurality of EEPROMs, (D) a plurality of EPROMs, (E) one EEPROM and one EPROM, (F) a plurality of EEPROMs and a plurality of EPROMs, (G) one EEPROM and a plurality of EPROMs, and (H) a plurality of EEPROMs and one EPROM.

In general, while an EPROM can be erased on a device basis, an EEPROM can be erased on a block basis where the inside of the EEPROM device is divided into a plurality of blocks called erasure blocks. It is most efficient that the special area of the ROM file 100 have a size that is equal to an integer multiple (one or larger) of the erasure unit and be arranged together as one or more erasure units. That is, although their addresses need not always be continuous, it should be avoided that one erasure unit includes both a special area and a read-only area.

Next, the configuration of the buffer 200 will be described.

Figure 4:
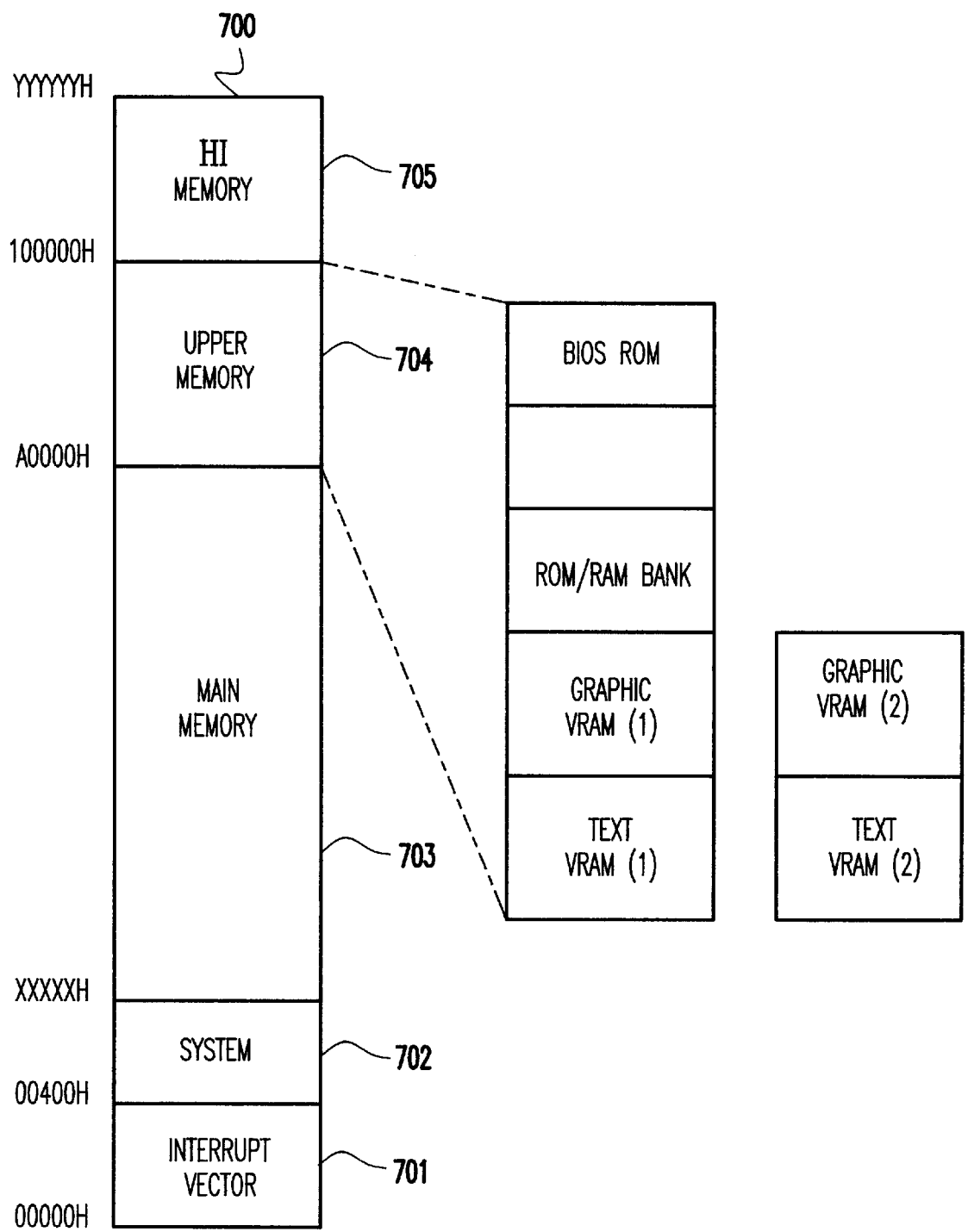
FIG. 4 is a memory map of MS-DOS.

Referring to FIG. 4, in the memory map of MS-DOS, a memory 700 has an upper limit address yyyyyyH. The upper limit value depends on the information processing apparatus.

An interrupt vector 701 stores branching destination address information that is used when interruption occurs in a program.

A system 702 is used as a working area of a DOS or a BIOS, or as a kernel system of the DOS. An upper limit address xxxxxH varies depending on the configuration of the information processing apparatus, the version of the DOS, and other factors.

A main memory 703 occupies an area of addresses xxxxxH to 9FFFFH. The main memory 703 usually stores application software that operates on the DOS, as well as data necessary for the operation of the application software. For some information apparatus, part of the memory system 703 serves as several memory banks that are switched by bank switching.

Addresses of an upper memory 704 are used by hardware that constitutes an information processing apparatus to perform access and control which hardware includes a text VRAM (video RAM) and a graphic VRAM for screen display of the information processing apparatus, a ROM for a BIOS, and a ROM/RAM bank memory. In some cases, there are provided screen-display VRAMs for two frames. Similarly, the ROM of the file device of the invention is usually configured as a ROM bank so as to be accessed and controlled by using the addresses of the upper memory 704. However, in some cases, the upper memory 704 may be provided as a memory bank that is implemented as part of the main memory 703, or may be allocated to part of a high memory (HI_MEM) 705.

The high memory 705 is a memory that can be used by a CPU having an address space of 1 Mbytes or more.

Among the above-described memories, the main memory 703 can be directly accessed from MS-DOS, but to access the upper memory 704 or the high memory 705, it is necessary to install a driver into MS-DOS. In general, application software cannot directly access the VRAM.

The buffer 200 can store not only a memory area usable by application software through MS-DOS, but also a memory area that is unusable by that application.

Next, the configuration of the special area of the ROM file 100 will be described.

Figure 5:
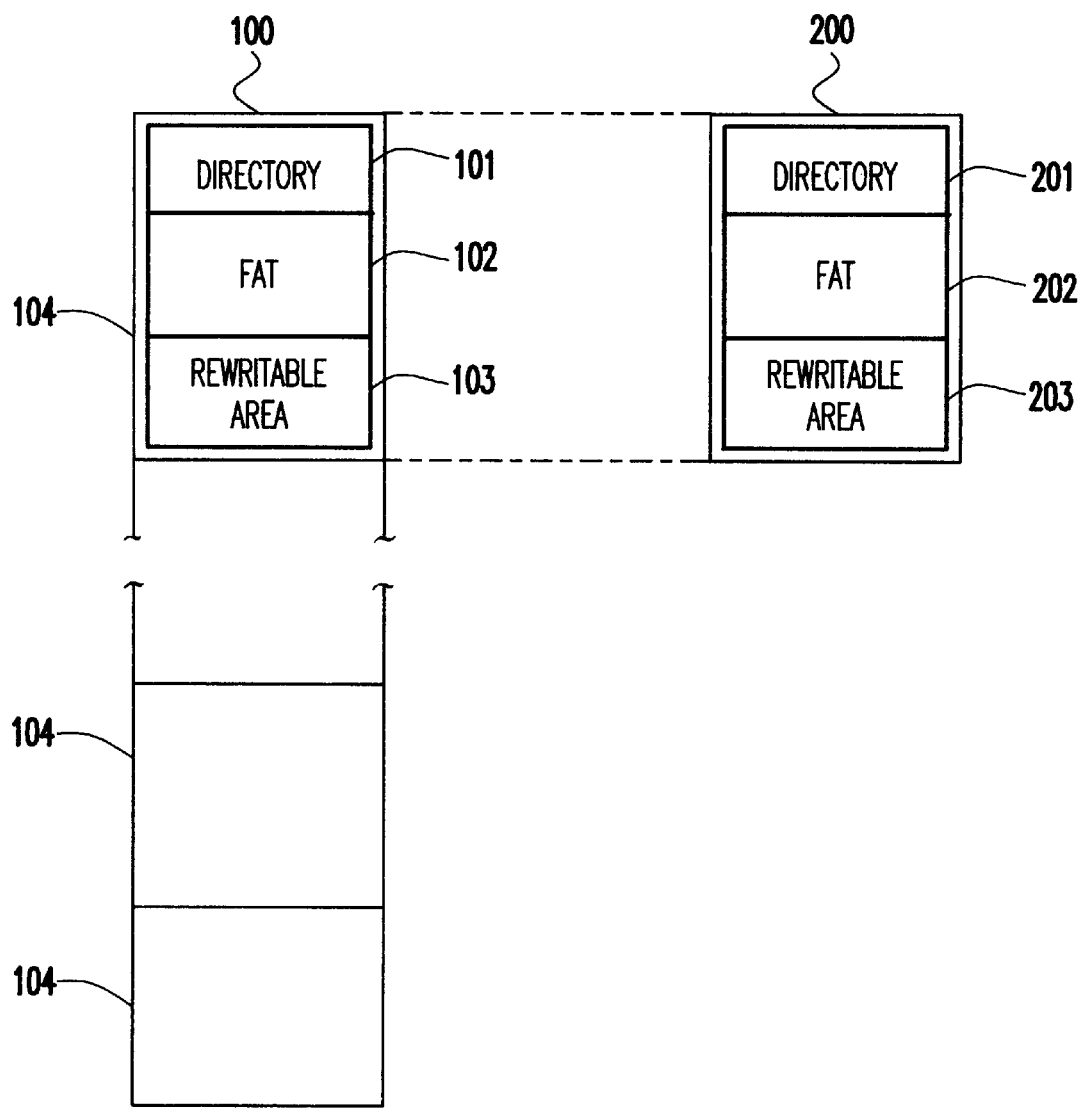
FIG. 5 shows an example of the configuration of the ROM file.

FIG. 5 shows an example of the configuration of the special area of the ROM file 100, which includes at least one erasure block 104. The special area is incorporated in and has the same size as one erasure block 104. The buffer 200 has the same size as one erasure block 104. The special area of the ROM file 100 is copied to the buffer 200 by the access controller 300, and thereafter writing to and reading from the special area is performed with respect to the buffer 200. In the end processing, the data of the buffer 200 is returned to the corresponding area of the ROM file 100 by the access controller 300.

Figure 6:
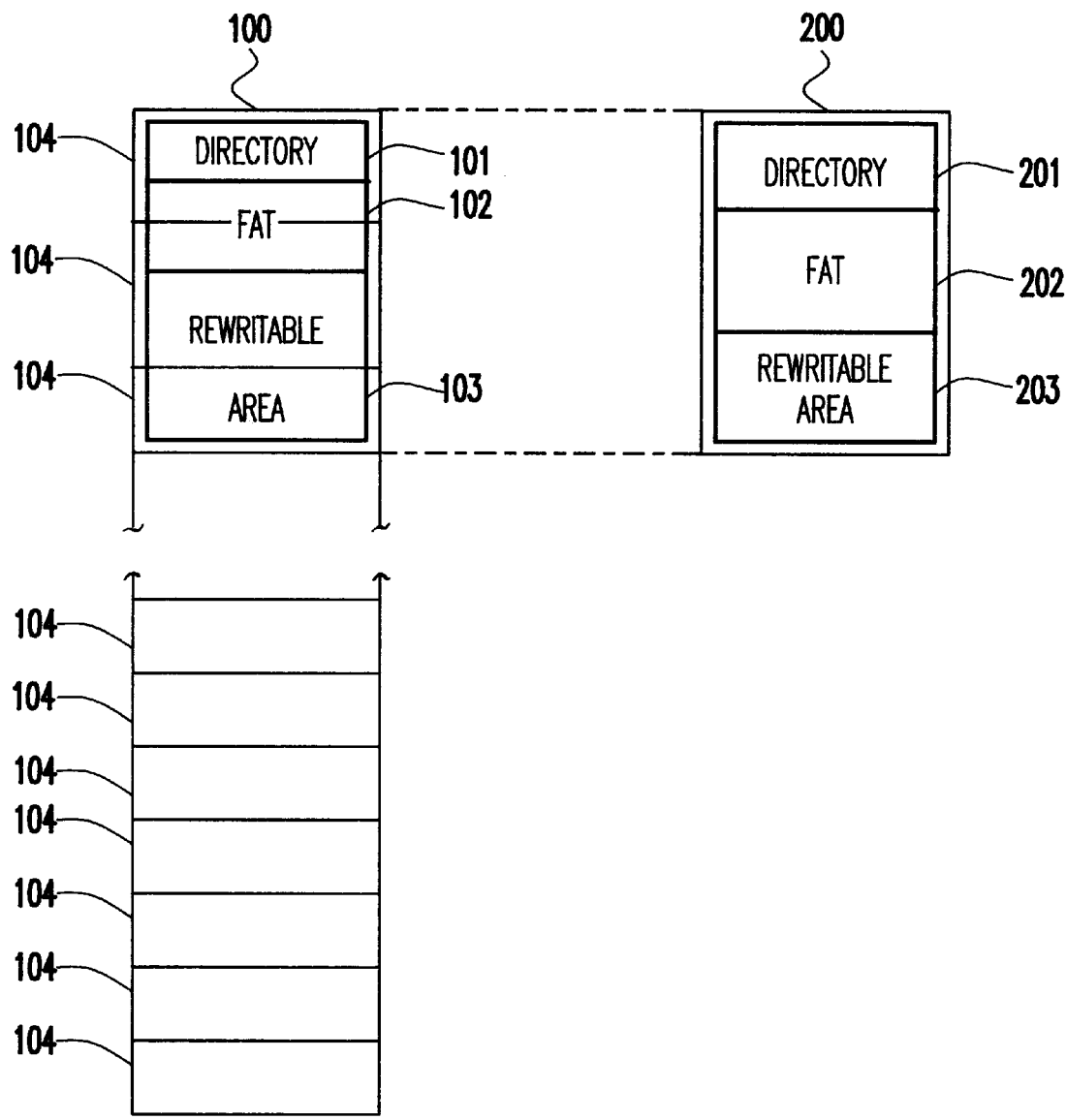
FIG. 6 shows another example of the configuration of the ROM file.

FIG. 6 shows another example of the configuration of the ROM file 100, which includes at least one erasure block 104 as in the above example. In this example, the special area is incorporated in and has the same size as a plurality of erasure blocks 104. The buffer 200 has the same size as the special area. The access operation is the same as in the above example.

Next, a more specific description will be made of the configuration of the ROM file 100, particularly the special area, shown in FIG. 5. As described above in connection with FIG. 3, the ROM file 100 is constituted of at least one EEPROM or EPROM. In this case, the special area is constituted of one erasure block.

Figure 7:
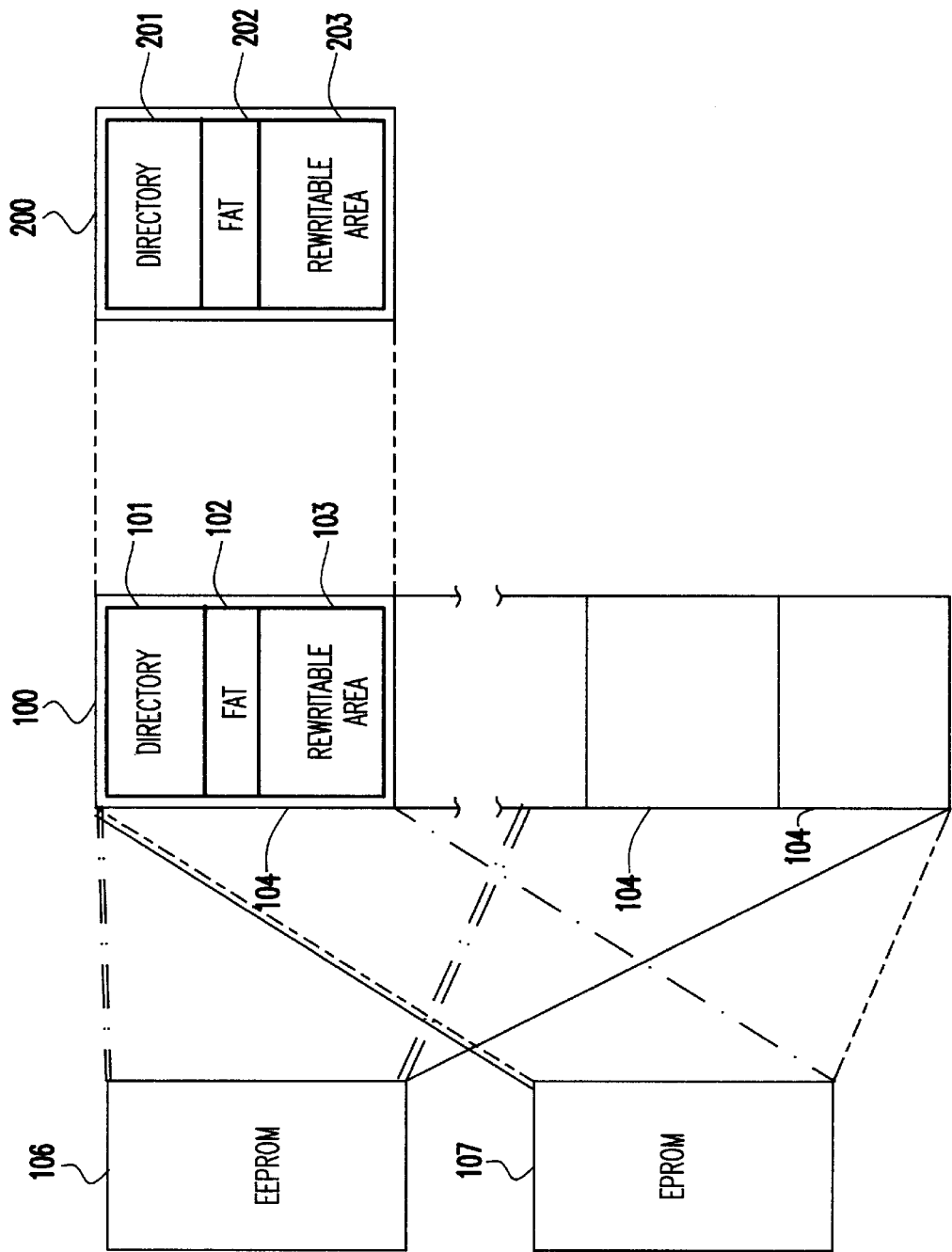
FIG. 7 shows a specific implementation of the example of FIG. 5.

Referring to FIG. 7, when an EEPROM 106 is used, the ROM file 100 may be constituted of one EEPROM 106 as indicated by a solid line, or a plurality of EEPROMs 106 as indicated by a chain line. In either case, one erasure block of the EEPROM 106 is used as the special area.

Similarly, when an EPROM 107 is used, the ROM file 100 may be constituted of one EPROM 107 as indicated by a dashed line, or a plurality of EPROMs 107 as indicated by a two-dot chain line. In the latter case, as indicated by the two-dot chain line, one EEPROM is used as the special area.

Next, a more specific description will be made of the configuration of the ROM file shown in FIG. 6. As in the case of FIG. 7, the ROM file 100 is constituted of at least one EEPROM or EPROM. In this example, the special area consists of a plurality of erasure blocks.

Figure 8:
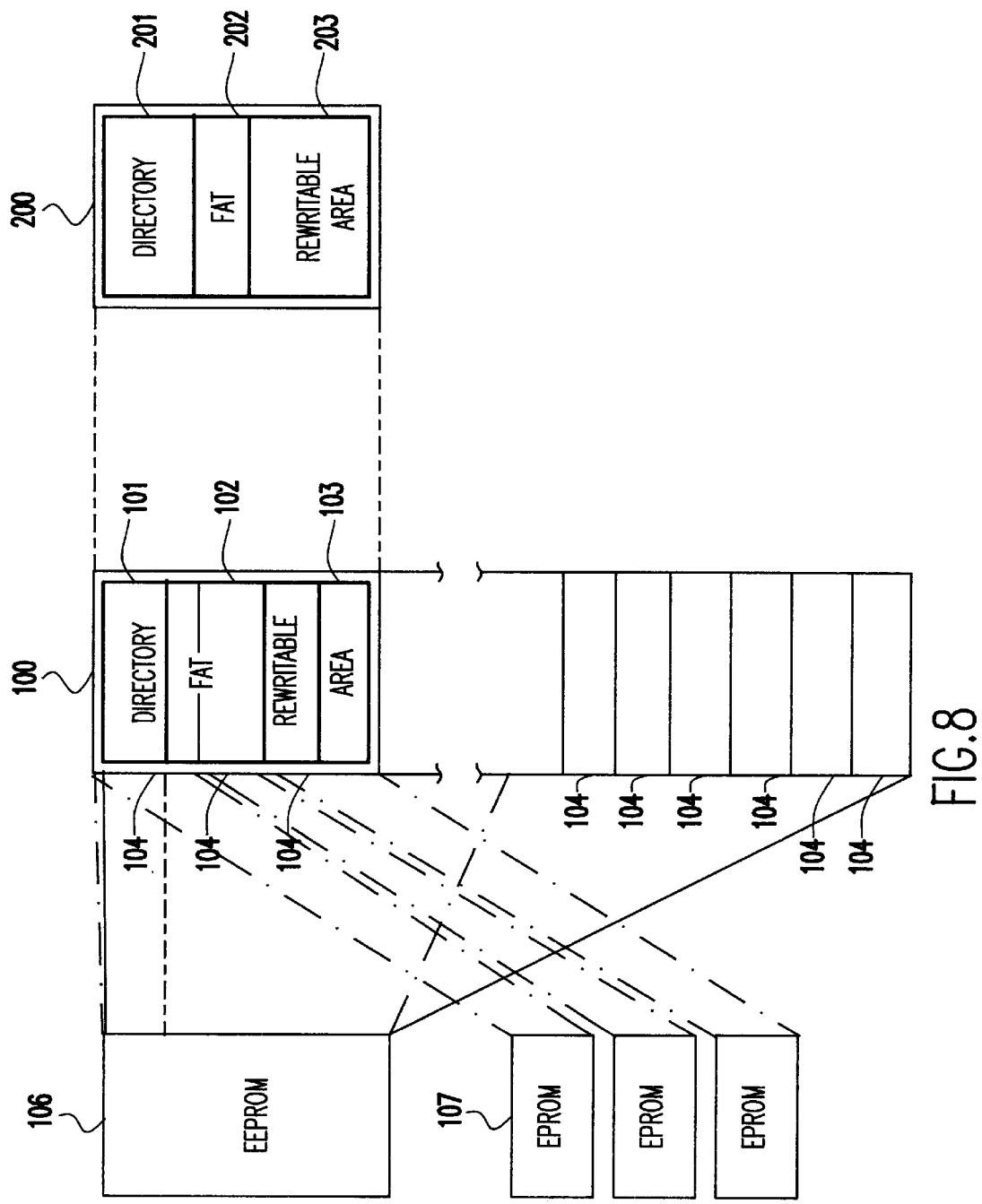
FIG. 8 shows a specific implementation of the example of FIG. 6.

Referring to FIG. 8, when an EEPROM 106 is used, the ROM file may be constituted of one EEPROM 106 as indicated by a solid line, or a plurality of EEPROMs 106 as indicated by a chain line. In either case, as indicated by a dashed line, a plurality of erasure blocks of the EEPROM 106 is used as the special area.

Similarly, when an EPROM 107 is used, the ROM file 100 consists of a plurality of EEPROMs 107 as indicated by a two-dot chain line. In this case, as indicated by the two-dot chain line, a plurality of EPROMs 107 are used as the special area.

Next, an example of the configuration of the buffer 200 will be described.

Referring to FIG. 4, an area having the same size as the special area of the ROM file 100 is allocated by using a memory having arbitrary addresses of addresses 0000H to 9FFFFH, a memory having arbitrary addresses of 10000H and higher, an EMS memory, or an arbitrary combination thereof, and is copied to the buffer 200.

Where a necessary area cannot be allocated so as to have continuous addresses, it may be allocated in a distributed manner. For example, A Kbytes of arbitrary addresses of addresses 0000H to 9FFFFH, B Kbytes of the upper memory, C Kbytes of the memory having addresses of 100000H and higher, and D Kbytes of the EMS memory may be combined to form a total area of (A+B+C+D) Kbytes which has the same size as the special area of the ROM file 100.

Another example of the configuration of the buffer 200 will be described.

Referring to FIG. 4, an area having the same size as the special area of the ROM file 100 is allocated by using, for example, part of a ROM/RAM bank, or a VRAM(2), i.e., part of a memory that usually an application program cannot directly access. The data of this area is copied to the buffer 200.

As in the above example, where a necessary area cannot be allocated as to have continuous addresses, it may be allocated in a distributed manner. For example, A Kbytes of a RAM bank and B Kbytes of a VRAM(2) may be combined to form a total area of (A+B) Kbytes which has the same size as the special area of the ROM file 100.

The operation of the rewritable ROM file device of the invention will be described in detail.

Figure 10A:
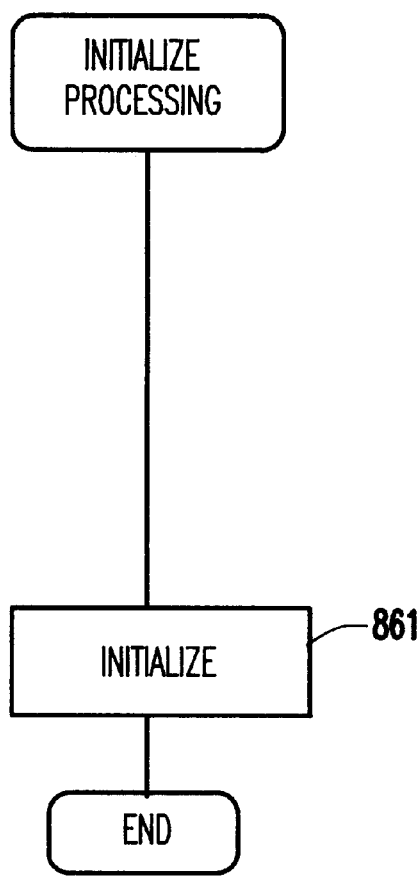
FIGS. 10A and 10B are flowcharts showing examples of initialize processing in the invention.
Figure 10B:
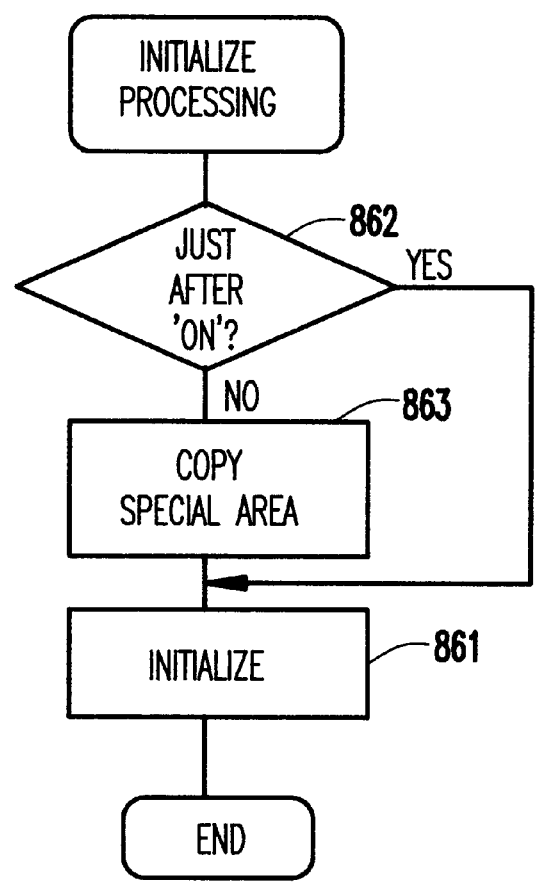

The initialize processing (step 860) is performed as shown in FIGS. 10A and 10B.

Referring to FIG. 10B, the initialize processing of the access controller 300 is effected when an information processing device to access the file device is powered on, or when a DOS is initialized. Referring to FIG. 10B, first whether it is immediately after the power-on is judged (step 862). If the judgment result is affirmative, all the data of the special area of the ROM file 100 is copied to the buffer 200. If a memory area to be used as the buffer 200 has not be allocated at this time point, a necessary memory area is allocated before the coping. After that, other initialize processing such as resetting of a flag indicating that it is immediately after the power-on, and various kinds of setting to allow operation of the access controller 300.

On the other hand, in the initialize processing of FIG. 10A, the copying that is performed in the case of FIG. 10B is not performed. Thus, the processing time is shorted by a copying time. Further, the life of the device is elongated by reducing the number of rewrite operations on an EEPROM. However, the processing speed is lowered when necessary data is not stored in the buffer 200. Therefore, either of the examples of FIGS. 10A and 10B cannot always be advantageous.

Figure 11A:
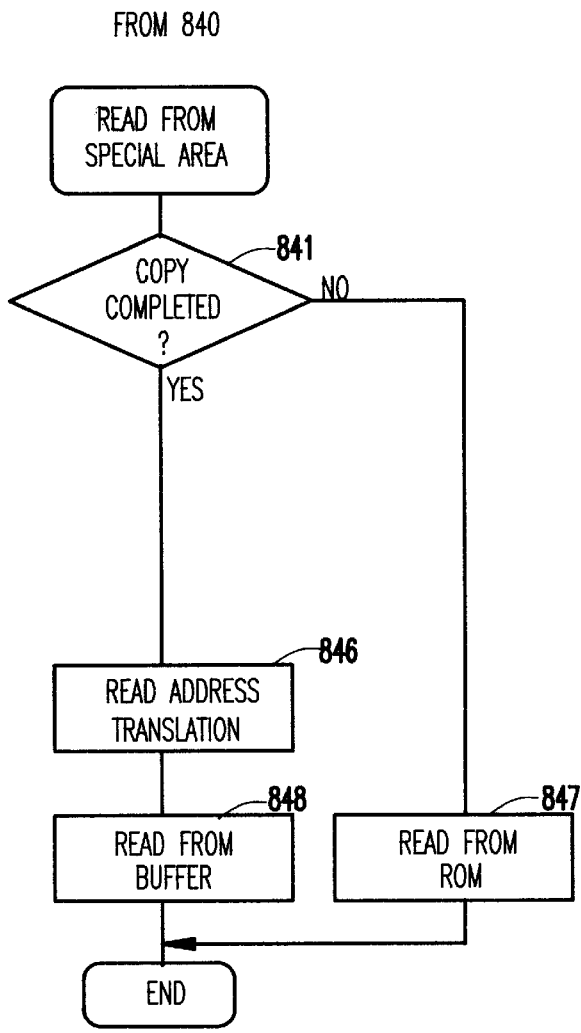
FIGS. 11A and 11B are flowcharts showing examples of read processing on a special area.
Figure 11B:
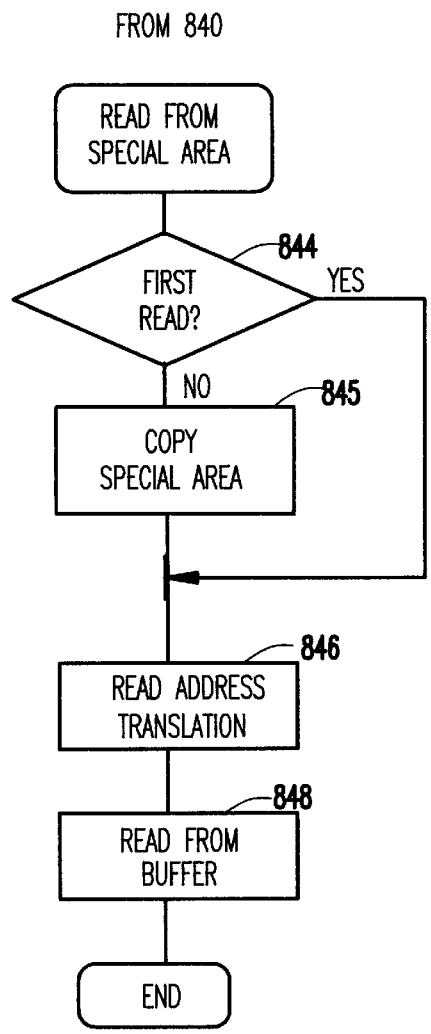

The read processing (step 840) is effected as shown in FIGS. 11A and 11B.

Referring to FIG. 11A, in the read processing, first it is checked whether the special area has been copied to the buffer 200 (step 841).

Figure 1:
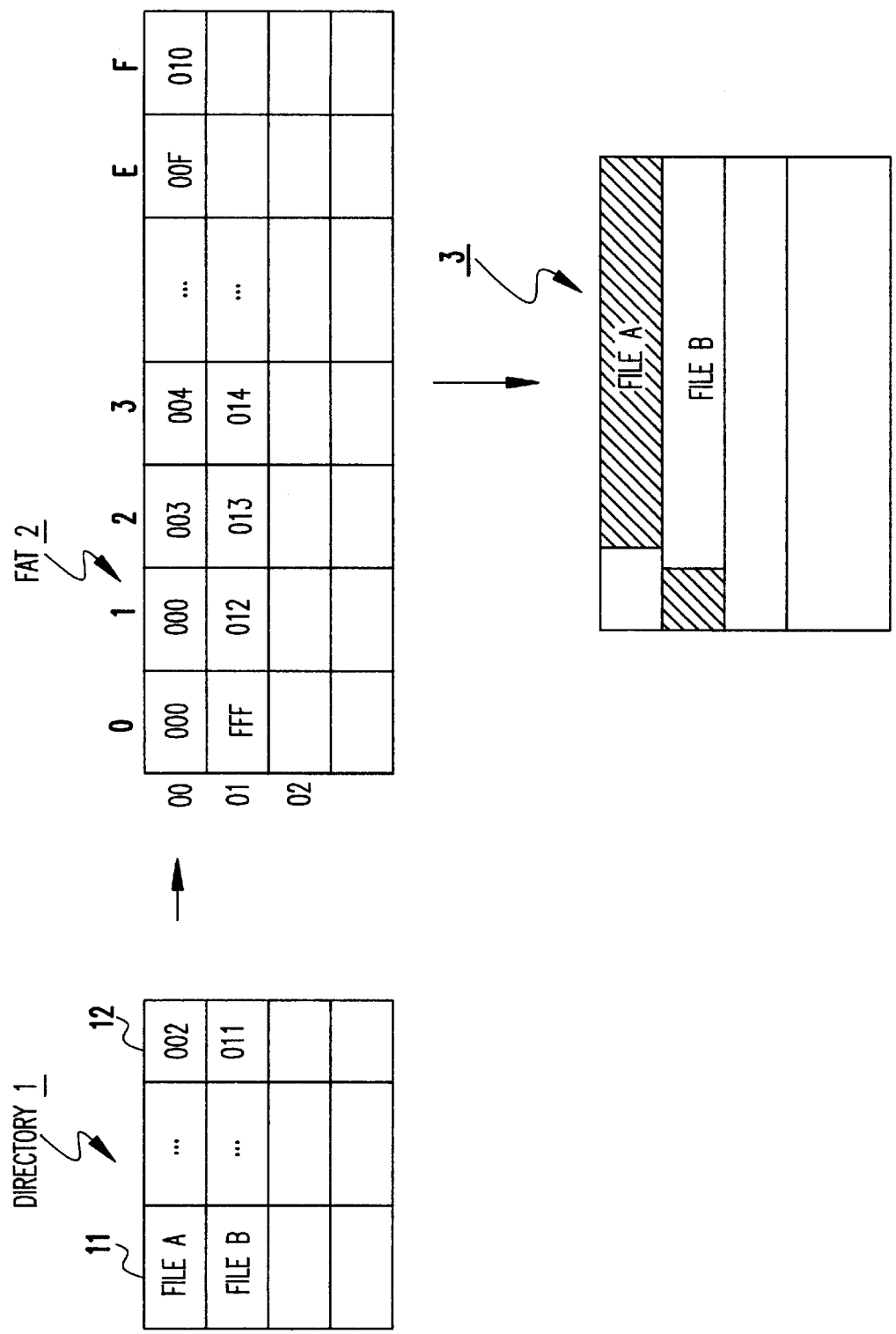
FIG. 1 shows a configuration for file management in MS-DOS.

If the judgment result is affirmative, data is read from the buffer 200 instead of the ROM file 100 (step 848). Since read addresses belong to the ROM file 100 when it is attempted to read data from the buffer 200, the access controller 300 translates the read addresses of the ROM file 100 into those of the buffer 200 (step 846). This address translation is done such that a read addresses of the special area 101–103 of the ROM file 100 is translated into a corresponding address of the buffer 200 by using an address translation table that is prepared in advance. For example, the head cluster address "002" of file A (see FIG. 1) is access-designated as a read address, a corresponding buffer address is automatically obtained by designating "002" in the address translation table (the corresponding buffer address is stored in advance in the address translation table).

If the special area has not been copied to the buffer 200 yet, data is read from the special area of the ROM file 100 (Step 847).

Referring to FIG. 11B, in reading data from the special area, it is checked whether the read operation concerned is for the first time (step 844). If the judgment result is affirmative, data is copied from the special area of the ROM file 100 to the buffer 200 (step 845). After that, address translation is performed (step 846), and data is read from the buffer 200 by using the translated addresses (step 848). The readout data is supplied to application software through a DOS.

Figure 12A:
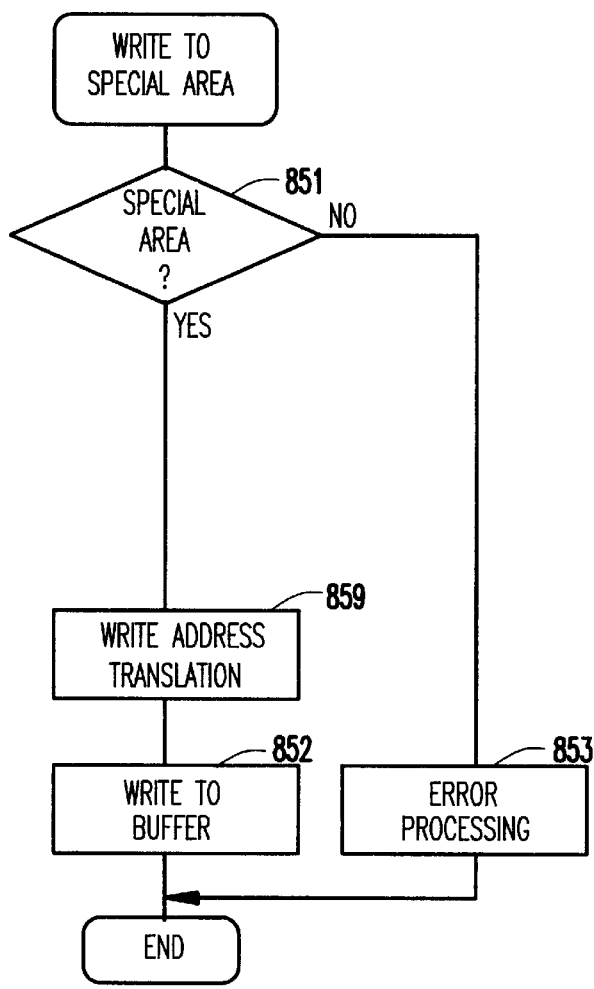
FIGS. 12A and 12B are flowcharts showing examples of write processing on the special area.
Figure 12B:
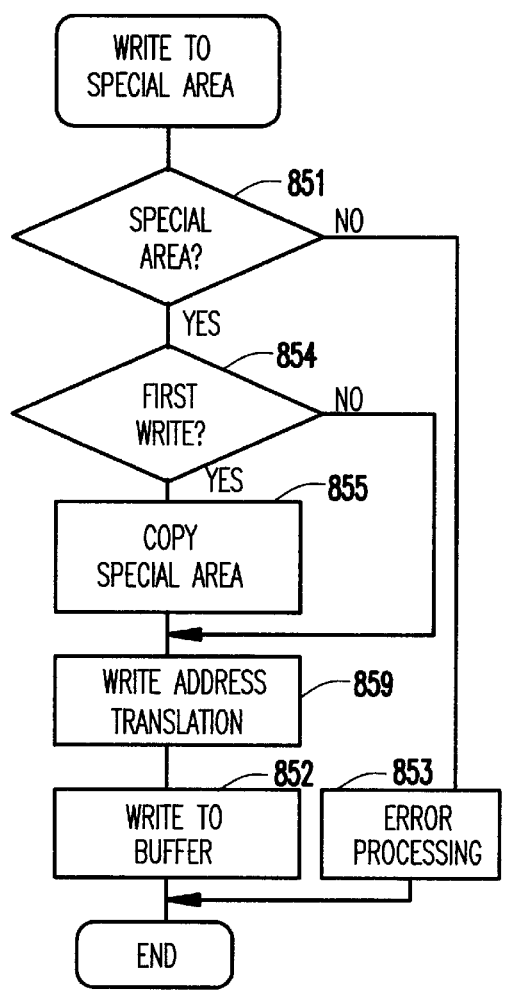

The write processing is performed as shown in FIGS. 12A and 12B.

Referring to FIG. 12B, in the write processing, it is checked whether the write operation concerned is for the first time (step 854). If the judgment result is affirmative, the data of the special area of the ROM file 100 is copied to the buffer 200 (step 855).

In this write processing, data is written to the buffer 200 instead of the ROM file 100 (step 852). Before that, write address translation is performed (step 859) in the same manner as in step 846 of FIG. 11A.

In the write processing, as described above, since a write file is necessarily stored in the special area of the ROM file 100, writing to the read-only area should not occur. This is why the flowchart of FIG. 9 does not include a step of checking for occurrence of writing to the read-only area. However, to prevent system destruction due to, for instance, an accident in a program, checking steps such as steps 851 and 853 may be provided. That is, it is checked whether writing is directed to the read-only area (step 851), and error processing is effected (step 853) if the judgment result is affirmative. For example, processing for an error of "writing to a write-prohibited file" is performed.

On the other hand, unlike the case of FIG. 12B, the copying of the special area is not performed in the processing of FIG. 12A. This is to shorten the time required for the copying as in the case of FIG. 10A. However, the processing speed is lowered when necessary data is not stored in the buffer 200. Therefore, either of the examples of FIGS. 12A and 12B cannot always be advantageous.

Actual processing is performed as a combination of the examples of processing described above.

A first combination is such that the initialize processing (step 860) is performed according to FIG. 10A, the read processing (step 840) is performed according to FIG. 11A, and the write processing (step 850) is performed according to FIG. 12A.

A second combination is such that the initialize processing (step 860) is performed according to FIG. 10A, the read processing (step 840) is performed according to FIG. 11B, and the write processing (step 850) is performed according to FIG. 12B.

A third combination is such that the initialize processing (step 860) is performed according to FIG. 10A, the read processing (step 840) is performed according to FIG. 11A, and the write processing (step 850) is performed according to FIG. 12B.

Next, referring to FIG. 13, a description will be made of the processing wherein the access controller 300 copies the data of the special area of the ROM file 100 to the buffer 200. This processing corresponds to step 855 of FIG. 10B, step 863 of FIG. 11B, and step 845 of FIG. 12B.

Figure 13:
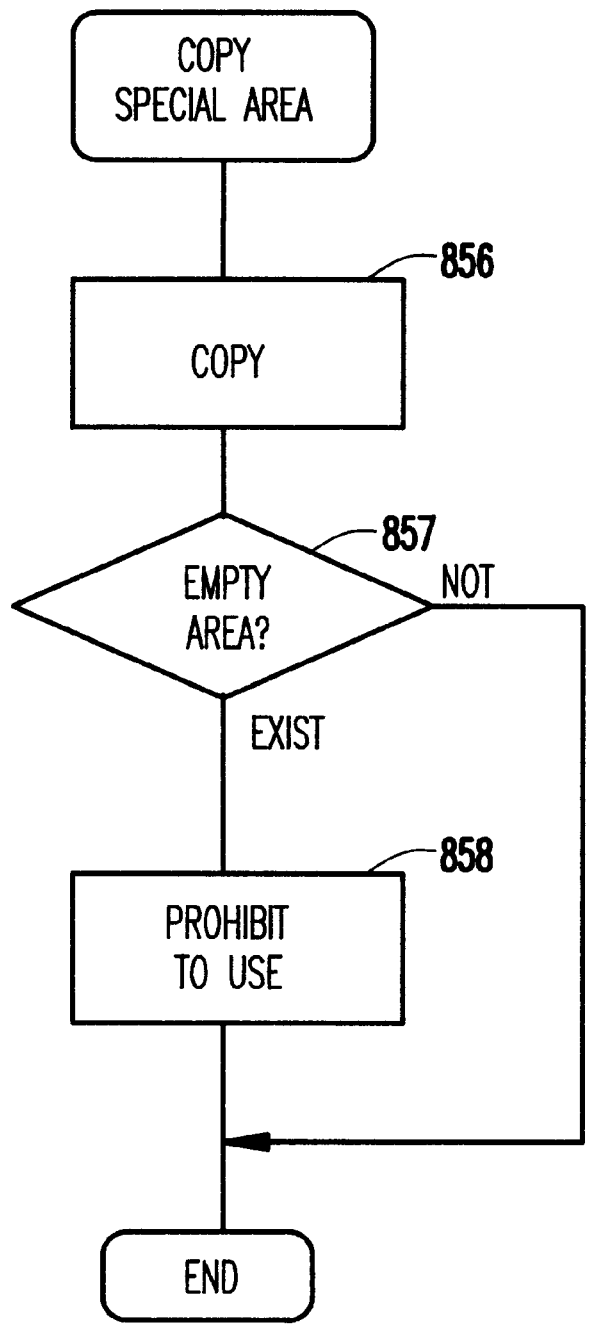
FIG. 13 is a flowchart showing processing of copying the special area.

Referring to FIG. 13, after the data of the special area of the ROM file 100 is copied to the buffer 200 (step 856), all of the unused portion of the read-only area of the ROM file 100 is changed to unusable (step 858). This may be done such that a DOS marks a broken cluster or sector of the file device as being broken, or write a dummy file. As a result, even when the DOS attempts to write a file to the read-only area, writing is not effected because there exists no empty area, thereby avoiding problems such as destruction of the file device. Writing to the read-only area may occur in such cases that a user of the file device attempts writing to a file that is not preset as belonging to the rewritable area, that the size of the rewritable area has been changed, and that the DOS system has changed the storage locations of files.

As described above, in the rewritable ROM file device of the invention, areas of the file device which may be rewritten are gathered together to form a unified area, i.e. special area. Since the data of the unified areas are copied into a buffer storage, all write operations after the copying is performed on the copied data on the buffer storage. The data of the buffer storage is returned to the rewritable ROM file immediately before the end of the use of the file device. Thus, the time required for rewriting of a file is shortened and the life of a storage device such as an EEPROM can be elongated which device has a limitation on the number of write operations performed on it.

What is claimed is:

1. An Erasable Programmable Read Only Memory (EPROM) file device comprising:

an EPROM that has a rewritable area having a predetermined storage capacity and has a read-only area;

a buffer having a storage capacity at least equal to the storage capacity of the rewritable area; and an access controller means for receiving and detecting an access request to the rewritable area, and for a copying of a data stored in the rewritable area to the buffer in response to power being supplied to said EPROM file device which occurs prior to the access controller receiving and detecting a first access to the rewritable area, and for converting said access requests to the rewritable area subsequent to said copying to be an access to the buffer, and for detecting when an operation of the EPROM file device is terminated, and for returning said data stored in the buffer to the rewritable area based on said detecting;

wherein said read-only area is directly accessed by the access controller means bypassing the buffer.

2. The EPROM file device according to claim 1 wherein said access request is any of the group of events consisting of: connecting a device for accessing the EPROM file device to the EPROM file device, replacing a device for accessing the EPROM file device that is connected to the EPROM file device, powering on a device for accessing the EPROM file device that is connected to the EPROM file device, and receiving an operating system initialization.

3. An Erasable Programmable Read Only Memory (EPROM) file device comprising:

an EPROM that has a rewritable area having a predetermined storage capacity and has a read-only area;

a buffer having a storage capacity at least equal to the storage capacity of the rewritable area; and an access controller means for receiving and detecting an access request to the rewritable area, and for a copying of a data stored in the rewritable area to the buffer in response to the access controller receiving and detecting a first access to the rewritable area, and for converting said access requests to the rewritable area subsequent to said copying to be an access to the buffer, and for detecting when an operation of the EPROM file device is terminated, and for returning said data stored in the buffer to the rewritable area based on said detecting;

wherein said read-only area is directly accessed by the access controller means bypassing the buffer.

* * * * *